United States Patent
Belisle et al.

(10) Patent No.: US 8,392,423 B2
(45) Date of Patent: Mar. 5, 2013

(54) DATA SET INDEX RECORD PRESERVATION

(75) Inventors: Jon C. Belisle, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 12/829,893

(22) Filed: Jul. 2, 2010

(65) Prior Publication Data

US 2012/0005528 A1  Jan. 5, 2012

(51) Int. Cl.
*G06F 17/30* (2006.01)
*G06F 7/00* (2006.01)

(52) U.S. Cl. .......................... 707/741; 707/668
(58) Field of Classification Search .................. 707/741, 707/668, 999.203
See application file for complete search history.

(56) References Cited

U.S. PATENT DOCUMENTS

| | | | |
|---|---|---|---|
| 5,437,012 A * | 7/1995 | Mahajan ........................ | 711/111 |
| RE35,881 E * | 8/1998 | Barrett et al. .................. | 707/758 |
| 6,934,822 B2 | 8/2005 | Armangau et al. | |
| 7,130,924 B2 | 10/2006 | Bartlett et al. | |
| 7,228,299 B1 * | 6/2007 | Harmer et al. ................ | 707/741 |
| 7,383,293 B2 | 6/2008 | Gupta et al. | |
| 7,603,391 B1 | 10/2009 | Federwisch et al. | |
| 7,647,466 B1 | 1/2010 | Rao et al. | |
| 2002/0178394 A1 * | 11/2002 | Bamberger et al. ............... | 714/1 |
| 2004/0255247 A1 * | 12/2004 | Demsky et al. ................ | 715/530 |
| 2005/0015466 A1 * | 1/2005 | Tripp ............................ | 709/219 |
| 2005/0091287 A1 * | 4/2005 | Sedlar .......................... | 707/200 |
| 2007/0100905 A1 * | 5/2007 | Masters et al. ................ | 707/201 |
| 2008/0177961 A1 | 7/2008 | McSharry et al. | |
| 2010/0005151 A1 * | 1/2010 | Gokhale ....................... | 709/216 |

FOREIGN PATENT DOCUMENTS

JP  6083687 A  3/1994

OTHER PUBLICATIONS

M.F. Khan et al., "Intensive Data Management in Parallel Systems: A Survey," Distributed and Parallel Databases, 7, pp. 383-414, 1999.
Laura DuBois et al., "Backup and Recovery: Accelerating Efficiency and Driving Down IT Costs Using Data Deduplication," IDC, #221849, Feb. 2010, 16 pages.

* cited by examiner

*Primary Examiner* — Cam Truong
(74) *Attorney, Agent, or Firm* — Griffiths & Seaton PLLC

(57) ABSTRACT

Various embodiments for preserving data set information in a computing storage environment are provided. In one such embodiment, at least one of a selected portion of an index record of the dataset is stored as a record in a subindex data set. The at least one component of the subindex data set is recoverable into the index record in an event of an error detected within the index record.

12 Claims, 3 Drawing Sheets

DATA SET INDEX RECORD PRESERVATION

BACKGROUND OF THE INVENTION

1. Field of the Invention

The present invention relates in general to computers, and more particularly to a method, system, and computer program product for preserving data set index record information in a computing storage environment.

2. Description of the Related Art

The majority of businesses in the world today use computers and computer operating systems to store and manage information. The information stored in computer operating systems is typically organized into catalogs. Users may want to pass information from one catalog to another for several reasons. For example, the user might want to assign each division within a company its own catalog. Thus, the company would need to pass information associated with the division that is stored in the company catalog into a corresponding division catalog.

Catalogs are utilized to organize and locate data sets. A catalog in essence is a data set that contains information required to locate other data sets. A data set is often the fundamental unit of data storage and retrieval and typically consists of a collection of data in one of several prescribed arrangements. These arrangements are described by control information to which the computer operating system has access. A data set is a collection of logically related data records stored on a single external storage volume, or a set of volumes. A data set can be, for example, a source program, a library of macros, or a file of data records used by a processing program. A catalog does not have to be on the same volume(s) as the data sets the catalog describes. A catalog can refer to hundreds or thousands of data sets spread across many volumes.

Catalogs are sometimes structured in an integrated catalog facility (ICF). An ICF catalog may include two components. One component contains non-data-specific information, or the logical description, of a data set. The other component contains data-specific information, or the physical description, of a data set. Catalogs allow users to find and access a data set by name without knowing the exact location of the data set in memory storage. By cataloging data sets, users do not need to know about the storage setup.

SUMMARY OF THE INVENTION

A common type of data sets in use in enterprise computing environments is so-called "Partitioned Data Set Extended" (PDSE) data sets. In these data sets, data is stored sequentially in members. The data set may grow into large numbers of segments (extents) and contain a large number of members. Each member has data that is unique and is accessed by that member name. The actual data for that member may be stored in several extents on direct access storage devices (DASD). In order to access those members a set of PDSE index information is required. One set of PDSE index information is the name directory. The name directory contains information such as the size, name, and location. Additional information is also stored in the attribute directory. The attribute directory has information such as timestamp of last update, updater, and other information that represents descriptive information about the data. If this index becomes damaged or corrupted, then data within the data set is no longer accessible.

In light of the foregoing, a need exists for a mechanism alleviating the drawbacks described previously, whereby a versioned copy of portions of index record information (for example, PDSE index information) is stored to allow for an index rebuild in the event of an overlaid or corrupted index.

Accordingly, various embodiments for preserving data set information in a computing storage environment are provided. In one such embodiment, by way of example only, at least one of a selected portion of an index record of the dataset is stored as a record in a subindex data set. The at least one component of the subindex data set is recoverable into the index record in an event of an error detected within the index record.

Additional system and computer program product embodiments are provided and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for preserving data set index record information in a computing storage environment. In one embodiment, portions of the index information from both the name and attribute directories, for example, are obtained. This allows for recovery access to this data, and creates a versioned subset index component in a separate, recoverable file. In an embodiment implementing Partitioned Data Set Extended (PDSE) data sets, this separate file is associated with the PDSE via a catalog entry. In the event of index breakage, the user can access the information in the PDSE subindex to access each member and rebuild the original index with sufficient information so that data access can continue. In the case of index corruption, several versions of each index record are kept, and are sorted by the last update field for that index record. Thus if one of the index records is erroneous, the prior index record can be used for access purposes. The catalog connection with the subindex allows for seamless access to the data portion by allowing the data to still be found. Unlike standard replication methods, which may replicate an entire track or block, the mechanisms of the present invention obtain only those portions of a block or a track to be replicated.

Figure 1:
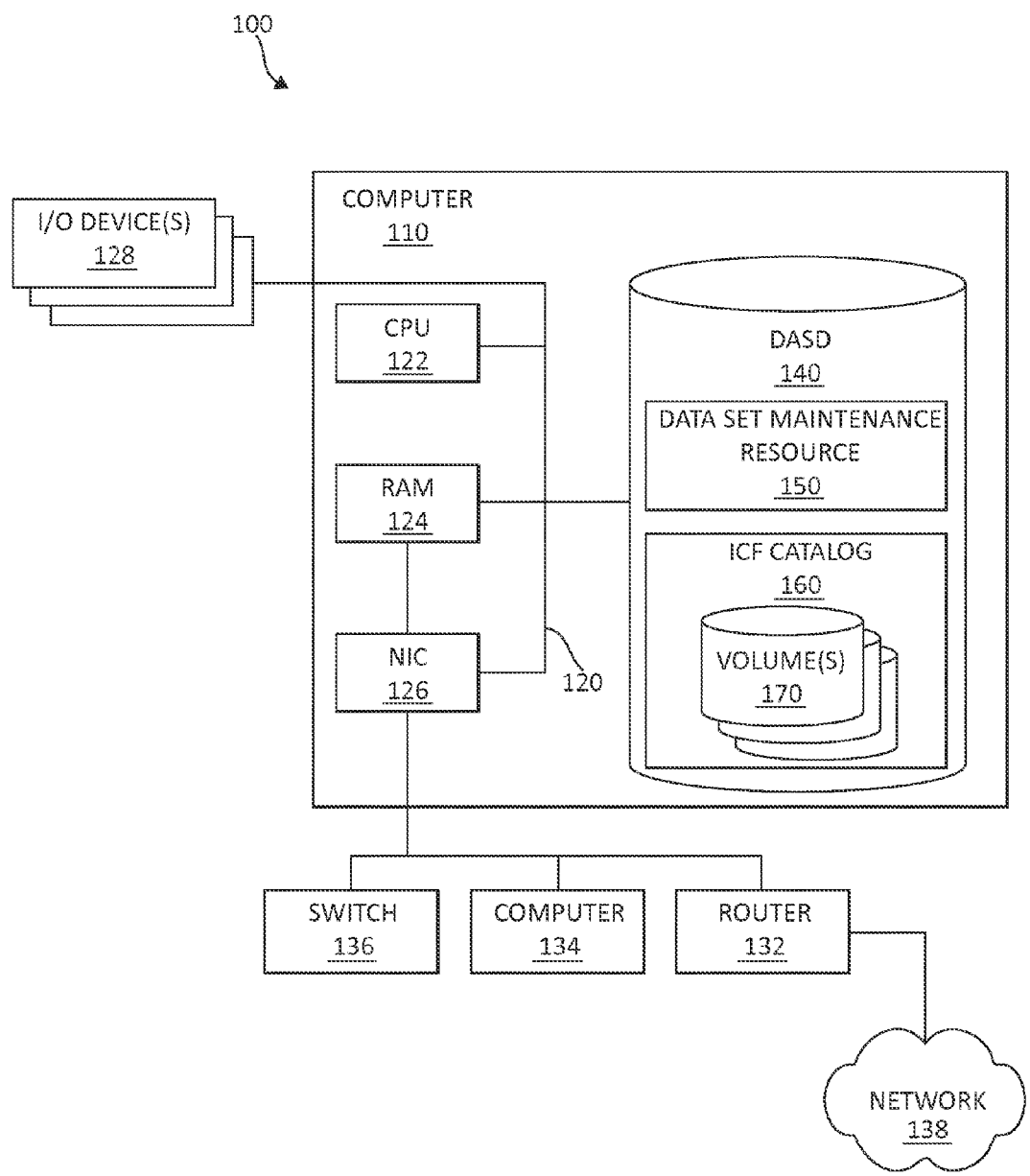
FIG. 1 is an exemplary computing environment.

FIG. 1 depicts one embodiment of a computer system for retaining data-set specific diagnostic information in accordance with the present invention. The computer system 100 includes a mainframe computer 110, a system bus 120, a central processing unit (CPU) 122, a random access memory (RAM) 124, a network interface card (NIC) 126, input/output (I/O) devices 128, a network 130, a router 132, a computer 134, a switch 136, the Internet 138, a direct access storage device (DASD) 140, a data set recovery resource 150, an integrated catalog facility (ICF) catalog 160, and one or more volumes 170.

The depicted computer 110 houses the system bus 120. The system bus 120 may provide a communication link among components within the mainframe computer 110 such as the CPU 122, the RAM 124, the NIC 126, and the DASD 140. In one embodiment, the CPU processes and transmits data received over the system bus 120 from and to components connected to the system bus 120. The system bus 120 may provide a communication link to peripheral devices such as I/O devices 128.

The I/O devices 128 may communicate with the mainframe computer 110 via the system bus 120. The I/O devices 128 may provide a communication channel from the computer 110 to a user. Each I/O device 128 may individually include a monitor, a keyboard, a mouse, or the like.

The network interface card 126 may communicate with devices external to the mainframe computer 110 via the network 130. In one embodiment, the network interface card 126 provides a communication link between the system bus 120 and the network 130, thus allowing the computer 110 to communicate with devices on the network 130. Such devices may comprise the computer 134, the switch 136, or the router 132. The computer 134 may be another computer 110, a workstation, a server, or the like. The router 124 may have a connection from the network 130 to the Internet 138.

The depicted DASD 140 may reside as a component in the mainframe computer 110. In one embodiment, the DASD 140 stores part of the data set recovery resource 150. In the depicted embodiment, the data set recovery resource 150 is housed entirely within the DASD 140. The DASD 140 may also store part of the ICF catalog 160. In the depicted embodiment, the ICF catalog 160 is housed entirely within the DASD 140. The ICF catalog 160 may comprise volumes 170. Volumes 170 may comprise data regarding data sets (i.e., metadata) as well the data sets themselves.

The ICF catalog 160 stores information about other data sets. In one embodiment, the ICF catalog 160 is a data set storing information about other data sets. This information may include data set attributes as well as data set locations to facilitate retrieving a desired data set only by name without requiring a user to specify the data set's location.

Figure 2:
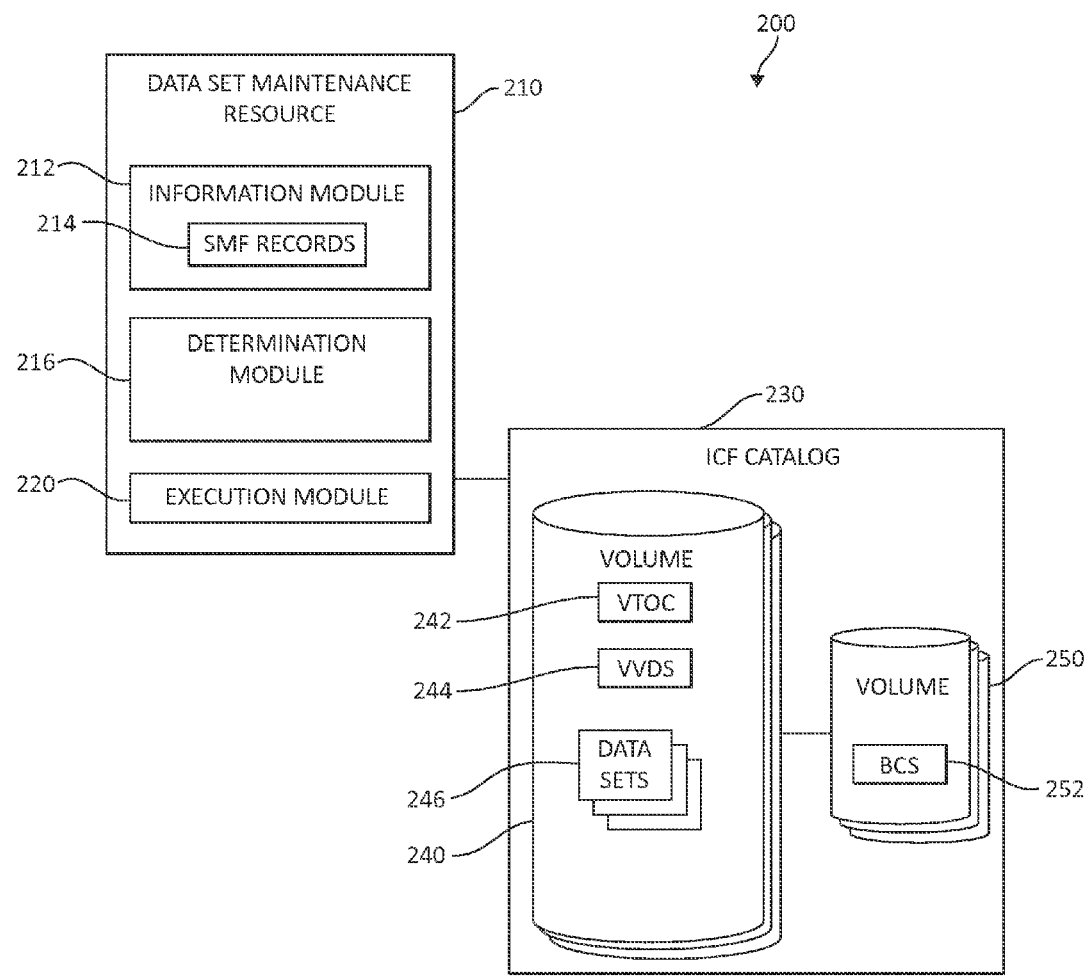
FIG. 2 is an exemplary data set maintenance resource.

FIG. 2 depicts one embodiment of a DASD environment comprising a data set maintenance resource and an integrated catalog facility (ICF) catalog in accordance with the present invention. The DASD environment 200 includes a data set maintenance resource 210, an information module 212, system management facility (SMF) records 214, a determination module 216, and an execution module 220. ICF catalog 230 includes a volume 240, a volume table of contents (VTOC) 242, a VSAM volume data set (VVDS) 244, data sets 246, diagnostic data set components 248 associated with the data sets 246, a volume 250, and a basic catalog structure (BCS) 252.

Data sets 246 are collections of logically related data records. Data sets 246 may include both VSAM and non-VSAM data sets. Virtual storage access method (VSAM) is an IBM® disk file storage scheme used in mainframe computer operating systems. The VSAM storage scheme has been implemented throughout operating systems utilizing the MVS (Multiple Virtual Storage) architecture. The MVS architecture originated in the MVS 24-bit IBM® operating system, which has evolved into the present z/OS® 64-bit IBM® operating system.

The VVDS 244 may be considered an extension of the VTOC 242. The VVDS 244 may store information about VSAM and non-VSAM data sets. Information not stored in the VTOC 242 may be stored in the VVDS 244 such as VSAM data set attributes, VSAM data set catalog name, and non-VSAM data set catalog name.

The BCS 252 may be used by the data set maintenance resource 210 to obtain information regarding data sets 246. The information that may be stored on the BCS 252 is a volume the data set resides on, a data set type, a data set association, and ownership of the data set. In one embodiment, the BCS 252 points to multiple VSAM Volume Data Sets and, consequently, to multiple Volume Table of Contents. The relationship between the BCS 252, VVDS 244, and VTOC 242 is not exclusive.

In the depicted embodiment, the data set maintenance resource 210 includes the information module 212, the determination module 216, and the execution module 220. The data set maintenance resource 210 may execute the preceding modules. In one embodiment, the data set maintenance resource 210 receives control statements from a director. A director may be a person, process, or application configured to provide a set of control statements. Control statements are a set of commands for the computer system. One example of control statements are Job Control Language (JCL) control statements. These statements identify the user, indicate what processes are to be run, what resources are required, and what priority to allocate to the job. The data set maintenance resource 210, in one embodiment, facilitates the mechanisms of the illustrated embodiments as will be further described, such as obtaining portions of index record information for creation of subindex data set information.

The information module 212 may retrieve information regarding data sets 246 on a volume 240 from the VTOC 242. The information retrieved by the information module 212 may include identification of one or more designated volumes. In one embodiment, control statements from the director are examined by the information module 212 to identify the designated volume. Control statements may be used to identify a function to be performed by a selected program or utility. Control statements may also be used to identify specific volumes or data sets to be maintained or processed. Other information retrieved by the information module may include a data set name, catalog status, the type entry in the catalog such as the type of data set or the VSAM index of a VSAM data set, or associated data set names if applicable. The information module 212 includes SMF records 214 in a data repository for tracking such actions as opening a file, closing a file, and catalog updates of VSAM data sets. Other information retrieved by the information module may include a data set name, catalog status, the type entry in the catalog such as the type of data set or the VSAM index of a VSAM data set, or associated data set names if applicable. The information retrieved may further include identification of data sets to bypass during the recovery.

In one embodiment, the information module 212 runs an IEHMAP utility to read the VTOC 242. IEHMAP is a utility that will analyze a volume and print a report showing the exact location of each extent of all the data sets on the volume. The IEHMAP utility may generate a report of the contents of the VTOC 242. In this embodiment, the information module 212 passes IEHMAP the initial control statements generated by the director and IEHMAP identifies the volumes 240 and 250 to perform maintenance on based on those control statements. The information obtained from the information module 212 may be gathered in a report where information may be extracted.

In the depicted embodiment, the determination module 214 determines one or more data set maintenance operations to perform. The determination module 214 may examine VTOC and/or VVDS information, including data set-specific diagnostic information to determine one or more operations to perform, such as operations pursuant to allocating a data set to a particular job or storage resource as one of ordinary skill in the art will appreciate.

The execution module 220 executes the one or more generated control statements to perform various operations on the data sets 246. The execution module may be adapted to execute unmodified or modified ACS routines, as will be further described.

The ICF catalog 230 may include the volumes 240 and 250. In the depicted embodiment, volume 240 includes the VTOC 242, the VSAM volume data set (VVDS) 244 and the data sets 246. Also in the depicted embodiment, volume 250 includes the basic catalog structure (BCS) 252. In the depicted embodiment, both the ICF catalog 230 and the data set recovery resource 210 reside on the DASD 140. The data set maintenance resource 210 may act on the ICF catalog 230 and its components to perform operations relating to the allocation and maintenance of subindex data set records, for example.

The mechanisms of the present invention will be further described, following, with reference to an exemplary embodiment incorporating PDSE index information. One of ordinary skill in the art will appreciate, however, that index record information for other data set types may be obtained in similar fashion to create subindex record information for recovery purposes.

In light of the foregoing, the mechanisms of the present invention, in one embodiment, obtain or pull portions of the index record deemed important for recovery purposes. This may include such fields as name, size, extent location(s) and last update fields. These fields may be stored in a data record having the data set name and last update fields combined as the key, with extent locations and sizes as the record data. These records may be stored in a new subindex data set as will be further described. Since this dataset only contains a subset of the entire PDSE index information, the overall size for one version of the index is much smaller than the original index typically stored within the PDSE data set itself. The new subindex data set may be defined as a data set associated with the base PDSE.

As the index records are updated in the PDSE, in one embodiment, these updates are also recorded in the subindex component. When the subindex component is defined, a predefined number of versions (e.g., three) may be taken for each retained record. The user may modify this retention version amount, as one of ordinary skill in the art will appreciate. Considering an embodiment having three predetermined versions, when those three versions have been created, and a new update to the PDSE is taken, the oldest record is then replaced with the new subindex record when the new record for that member name is added.

At a subsequent time, when the PDSE itself detects an error within the index structure, PDSE will automatically regenerate the important portions of the index information in order for the user to continue to access his data. If the user detects an issue with their PDSE data set, they may recover the index to the most current entry for each member. If the index corruption was replicated into the subindex information, then the user may specify an older version of the index record to recover that index information in the base PDSE. In the event the index of the PDSE is corrupted, the data in the subindex can be used to show the historical changes in the index to help discover the source of the index corruption.

Figure 3:
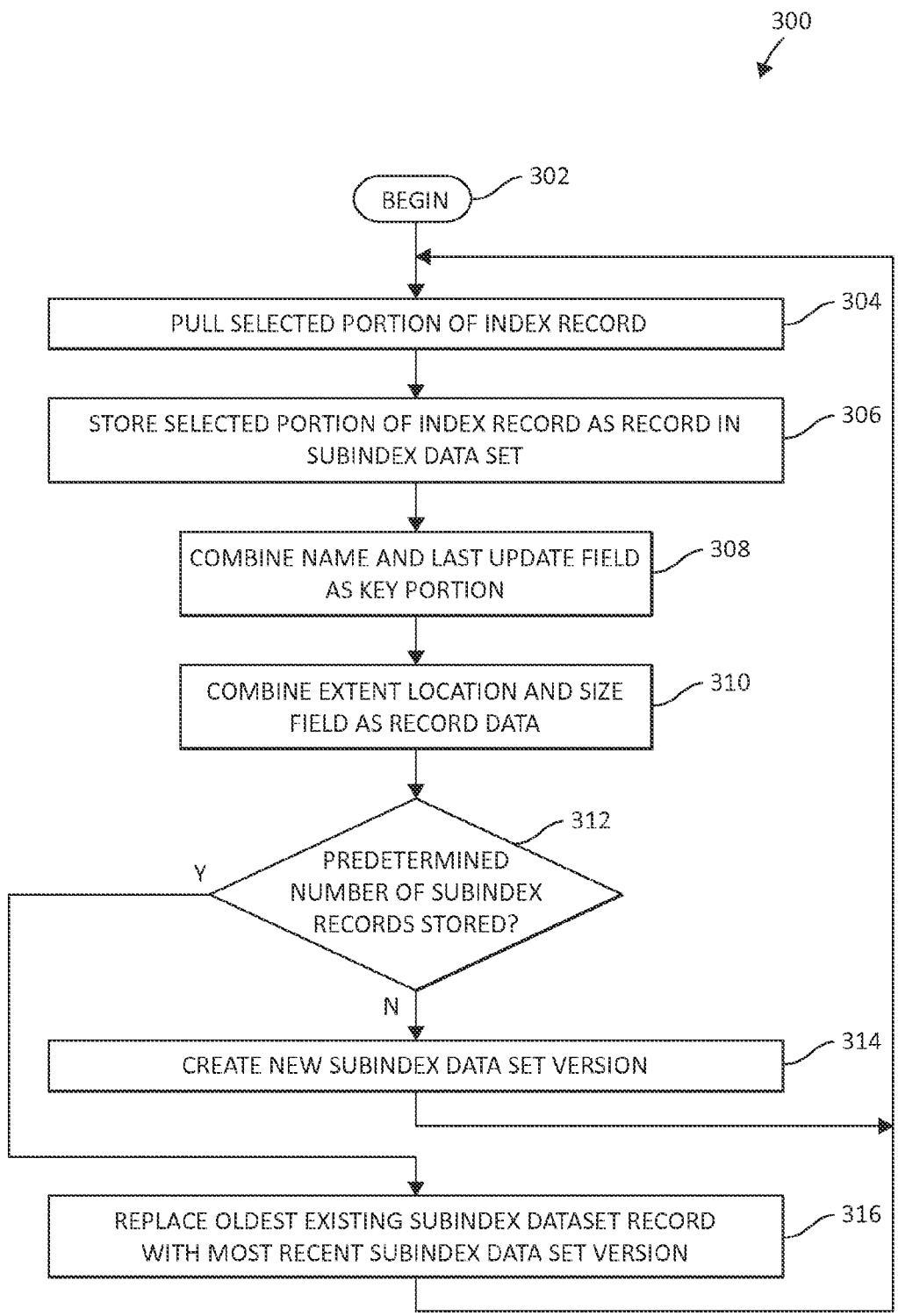
FIG. 3 is a flow chart diagram of an exemplary method for preserving data set information in a computing storage environment.

Turning now to FIG. 3, a logic flow diagram of an exemplary method 300 for preserving data set information in a computing storage environment is depicted. As one skilled in the art will appreciate, the described method may be implemented by various means, such as hardware, software, firmware, or a combination thereof operational on or otherwise associated with the computing storage environment. For example, the method 300 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums. The method 300 may be carried out by various components of the data set maintenance resource 210 (FIG. 2), as previously described, such as by various data set modules.

Method 300 begins (step 302) with selected portions of the data set index record pulled (step 304). In one embodiment, this is performed pursuant to an update of the data set (e.g., PDSE) as previously described. The selected portion of the index record is stored as a subindex data set record (step 306). In one embodiment, pursuant to this storage, the name and last update field are combined as the key portion (step 308) as previously described. In addition, the extent location and size filed are combined as the record portion (step 310) as previously described.

If a predetermined number of subindex records have not been stored (step 312), then a new subindex data set version is created (step 314), and the method 300 returns to step 304 to pull additional information at a subsequent time (such as at a later update). If the predetermined number of subindex records have been previously stored (again, step 312), the method 300 moves to step 316, where the oldest existing subindex data set record is replaced with the most recent subindex data set version. The method 300 then returns to step 304 as previously described.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for preserving data set information in a computing storage environment by a processor device, comprising:
    pulling portions of index information from a name directory and an attribute directory to form a new subindex data set that is stored as a separate file from the name directory and the attribute directory, the name directory and the attribute directory each being associated with partitioned data set extended (PDSE) data sets stored sequentially in members, and the new subindex data set being associated with the PDSE data sets via a catalog entry;
    pursuant to an update to the PDSE data sets, storing at least one of a selected portion of an index record of the dataset as a record in the new subindex data set, wherein the step of storing at least one portion includes acting on an integrated catalog facility (ICF) catalog to perform operations relating to allowacation and maintenance of the new subindex data set;
    combining a name and a last update field of the index record as a key of the record in the new subindex data set;
    combining an extent location and a size field of the index record as data of the record in the new subindex data set;
    replacing an oldest existing record with a most recent version if a determination is made that adding the most recent version exceeds a predetermined number of versions, wherein at least one component of the new subindex data set is recoverable into the index record in an event of an error detected within the index record; and
    referring to the new subindex data set to determine a historical change of an index comprising at least the index record to discover a source of an index corruption, in an event the index is corrupted, wherein the step of referring to the new subindex data set includes referring to the extent location and the size field data in the new subindex data set to determine the historical change of the index comprising at least the index record from reviewing each version of the predetermined number of versions to discover the source of an index corruption.

2. The method of claim 1, further including pulling the at least one of the selected portion from the index record.

3. The method of claim 1, further including storing another selected portion of the index record of the dataset in the new subindex data set.

4. The method of claim 1, further including, pursuant to an update of the index record, performing at least one of updating the at least one component of the new subindex data set and storing the at least one of the selected portion of the index record as an additional version of the at least one component of the new subindex data set.

5. The method of claim 1, further comprising regenerating portions of the index from the data of the records in the new subindex data set to allow a user continued access to the data, in an event the index is corrupted.

6. The method of claim 1, further comprising obtaining the name, the extent location, and the size field are from the name directory, and the last update field from the name directory.

7. A system for preserving data set information in a computing storage environment, comprising:
a processor; and
a data storage device in communication with the processor including a data set module operational in the computing storage environment,
wherein the data set module for:
pulling portions of index information from a name directory and an attribute directory to form a new subindex data set that is stored as a separate file from the name directory and the attribute directory, the name directory and the attribute directory each being associated with partitioned data set extended (PDSE) data sets stored sequentially in members, and the new subindex data set being associated with the PDSE data sets via a catalog entry,
pursuant to an update to the PDSE data sets, storing at least one of a selected portion of an index record of dataset as a record in the new subindex data set, wherein the step of storing at least one portion includes acting on an integrated catalog facility (ICF) catalog to perform operations relating to allowacation and maintenance of the new subindex data set;
combining a name and a last update field of the index record as a key of the record in the new subindex data set,
combining an extent location and a size field of the index record as data of the record in the new subindex data set,
replacing an oldest existing record with a most recent version if a determination is made that adding the most recent version exceeds a predetermined number of versions, wherein at least one component of the new subindex data set is recoverable into the index record in an event of an error detected within the index record, and
referring to the new subindex data set to determine a historical change of an index comprising at least the index record to discover a source of an index corruption, in an event the index is corrupted, wherein the step of referring to the new subindex data set includes referring to the extent location and the size field data in the new subindex data set to determine the historical change of the index comprising at least the index record from reviewing each version of the predetermined number of versions to discover the source of an index corruption.

8. The system of claim 7, wherein the data set module is further for pulling the at least one of the selected portion from the index record.

9. The system of claim 7, wherein the data set module is further for, pursuant to an update of the index record, performing at least one of updating the at least one component of the new subindex data set and storing the at least one of the selected portion of the index record as an additional version of the at least one component of the new subindex data set.

10. A computer program product preserving data set information in a computing storage environment, the computer program product comprising a non-transitory computer-readable storage medium having computer-readable program code portions stored therein, the computer-readable program code portions comprising:
a first executable portion for pulling portions of index information from a name directory and an attribute directory to form a new subindex data set that is stored as a separate file from the name directory and the attribute directory, the name directory and the attribute directory each being associated with partitioned data set extended (PDSE) data sets stored sequentially in members, and the new subindex data set being associated with the PDSE data sets via a catalog entry,
a second executable portion for, pursuant to an update to the PDSE data sets, storing at least one of a selected portion of an index record of dataset as a record in the new subindex data set, wherein the step of storing at least one portion includes acting on an integrated catalog facility (ICF) catalog to perform operations relating to allowacation and maintenance of the new subindex data set;
a third executable portion for combining a name and a last update field of the index record as a key of the record in the new subindex data set;
a fourth executable portion for combining an extent location and a size field of the index record as data of the record in the new subindex data set;
a fifth executable portion for replacing an oldest existing record with a most recent version if a determination is made that adding the most recent version exceeds a predetermined number of versions, wherein at least one component of the new subindex data set is recoverable into the index record in an event of an error detected within the index record; and
a sixth executable portion for referring to the new subindex data set to determine a historical change of an index comprising at least the index record to discover a source of an index corruption, in an event the index is corrupted, wherein the step of referring to the new subindex data set includes referring to the extent location and the size field data in the new subindex data set to determine the historical change of the index comprising at least the index record from reviewing each version of the predetermined number of versions to discover the source of an index corruption.

11. The computer program product of claim 10, further including a seventh executable portion for pulling the at least one of the selected portion from the index record.

12. The computer program product of claim 10, further including a seventh executable portion for, pursuant to an update of the index record, performing at least one of updating the at least one component of the new subindex data set and storing the at least one of the selected portion of the index record as an additional version of the at least one component of the new subindex data set.

* * * * *